(12) United States Patent
Narayanam et al.

(10) Patent No.: US 12,379,967 B2
(45) Date of Patent: Aug. 5, 2025

(54) DEGRADATION PLANNING AND MITIGATION IN HYBRID CLOUD ENVIRONMENTS

(71) Applicant: International Business Machines Corporation, Armonk, NY (US)

(72) Inventors: Krishnasuri Narayanam, Bangalore (IN); Ashok Pon Kumar Sree Prakash, Bangalore (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 17/542,623

(22) Filed: Dec. 6, 2021

(65) Prior Publication Data
US 2023/0176916 A1 Jun. 8, 2023

(51) Int. Cl.
*G06F 9/50* (2006.01)
*G06F 11/30* (2006.01)
*G06F 11/34* (2006.01)

(52) U.S. Cl.
CPC ............ *G06F 9/505* (2013.01); *G06F 9/5077* (2013.01); *G06F 11/301* (2013.01); *G06F 11/3495* (2013.01)

(58) Field of Classification Search
CPC ...... G06F 9/505; G06F 9/5077; G06F 11/301; G06F 11/3495
See application file for complete search history.

(56) References Cited

U.S. PATENT DOCUMENTS

| 10,552,274 B1 * | 2/2020 | Zhao ................... G06F 11/2082 |
| 10,956,447 B2 | 3/2021 | Arnold et al. |
| 2016/0094410 A1 | 3/2016 | Anwar et al. |

(Continued)

FOREIGN PATENT DOCUMENTS

CN 112187505 A 1/2021

OTHER PUBLICATIONS

Fu et al. "QoS-Aware and Resource Efficient Microservice Deployment in Cloud-Edge Continuum" (Year: 2021).*

(Continued)

*Primary Examiner* — Sisley N Kim
(74) *Attorney, Agent, or Firm* — Daniel Yeates; Ryan, Mason & Lewis, LLP

(57) ABSTRACT

A computer program product comprises a computer readable storage medium having program instructions embodied therewith. The program instructions are executable by one or more processors to cause the one or more processors to construct an interaction graph based in part on a distributed application of a cloud platform comprised of a plurality of services; extract one or more sub-graphs from the interaction graph by mining the interaction graph using one or more feasibility validation tests; estimate a resource pressure metric for the one or more sub-graphs, wherein the resource pressure metric is at least one of a prospective resource pressure metric and a retrospective resource pressure metric, the resource pressure metric being associated with each service on one or more respective dependent services; construct a degradation plan for a least-cost sub-graph in accordance with the estimated resource pressure metric; and apply the degradation plan to the distributed application and the cloud platform.

20 Claims, 10 Drawing Sheets

(56) References Cited

U.S. PATENT DOCUMENTS

| | | | |
|---|---|---|---|
| 2016/0098292 A1* | 4/2016 | Boutin | G06F 9/4881 718/104 |
| 2019/0121979 A1* | 4/2019 | Chari | G06F 8/433 |
| 2019/0303475 A1* | 10/2019 | Jindal | G06F 16/24545 |
| 2022/0200927 A1* | 6/2022 | Li | H04L 47/83 |

OTHER PUBLICATIONS

M. Zhang et al., "A Cloud Infrastructure Service Recommendation System for Optimizing Real-time QoS Provisioning Constraints," arXiv: 1504.01828v1, Apr. 8, 2015, 12 pages.

J. Etzlstorfer, "A Framework for Self-Healing Applications—The Path to Enable Auto-Remediation," Developer Week, Jun. 27, 2018, 31 pages.

S. Lehnert, "A Review of Software Change Impact Analysis," Computer Science, 2011, 38 pages.

G. S. Machado et al., "Refined Failure Remediation for It Change Management Systems," 2009 IFIP/IEEE International Symposium on Integrated Network Management, Jun. 2009, pp. 638-645.

S. Kappagantula, "Microservice Architecture—Learn, Build, and Deploy Applications," https://dzone.com/articles/microservice-architecture-learn-build-and-deploy-a, Jul. 3, 2018, 11 pages.

P. Mell et al., "The NIST Definition of Cloud Computing," Recommendations of the National Institute of Standards and Technology, Special Publication 800-145, Sep. 2011, 7 pages.

M. Salehie et al., "Self-Adaptive Software: Landscape and Research Challenges," ACM Transactions on Autonomous and Adaptive Systems, vol. 4, No. 2, Mar. 2009, pp. 1-40.

M. Boelen, "Monitor File Access by Linux Processes," https://linux-audit.com/monitor-file-access-by-linux-processes/, Jul. 3, 2015, 13 pages.

* cited by examiner

```
open (" /var/log/cups/page_log", O_RDWR | O_CREAT | O_APPEND, 0666) = 0
fstat (6, {st_mode=S_IFREG | 0640, st_size=0, ...} ) = 0
lstat ("/var/log/cups/page_log", {st_mode=S_IFREG | 0640, st_size=0, ...}) = 0
lseek (6, 0, SEEK_END)              = 0
fcntl (6, F_GETFD)                  = 0
fcntl (6, F_SETFD, FD_CLOEXEC)      = 0
fchown (6, 0, 4)                    = 0
fchmod (6, 0640)                    = 0
lstat ("/etc/cups/ssl/server.crt" , {st_mode=S_IFLNK|0777, st_size=36, ...} ) = 0
stat ("/etc/cups/ssl/server.crt" , {st_mode=S_IFREG|0644, st_size=989, ...}) = 0
lstat ("/etc/cups/ssl/server.key" , {st_mode=S_IFLNK|0777, st_size=38, ...} ) = 0
stat ("/etc/cups/ssl/server.key" , {st_mode=S_IFREG|0640, st_size=1704, ...}) = 0
lstat ("/var/spool/cups" , {st_mode=S_IFDIR|0710, st_size=4096, ...} ) = 0
lstat ("/var/cache/cups" , {st_mode=S_IFDIR|0775, st_size=4096, ...} ) = 0
lstat ("/var/cache/cups/rss" , {st_mode=S_IFDIR|0775, st_size=4096, ...} ) = 0
lstat ("/var/run/cups" , {st_mode=S_IFDIR|0755, st_size=100, ...} ) = 0
lstat ("/var/run/cups/certs" , {st_mode=S_IFDIR|0511, st_size=40, ...} ) = 0
lstat ("/etc/cups" , {st_mode=S_IFDIR|0755, st_size=4096, ...} ) = 0
lstat ("/etc/cups/ppd" , {st_mode=S_IFDIR|0755, st_size=4096, ...} ) = 0
lstat ("/etc/cups/ssl" , {st_mode=S_IFDIR|0700, st_size=4096, ...} ) = 0
lstat ("/etc/cups/classes.conf", 0x7fffb52b7650) = -1 ENOENT (No such file or directory)
lstat ("/etc/cups/printers.conf", 0x7fffb52b7650) = -1 ENOENT (No such file or directory)
lstat ("/etc/cups/passwd.md5", 0x7fffb52b7650) = -1 ENOENT (No such file or directory)
stat ("/var/spool/cups/tmp" , {st_mode=S_IFDIR|S_ISVTX|0770, st_size=4096, ...}) = 0
lstat ("/var/spool/cups/tmp" , {st_mode=S_IFDIR|S_ISVTX|0770, st_size=4096, ...}) = 0
stat ("/etc/papersize" , {st_mode=S_IFREG|0644, st_size=3, ...}) = 0
stat ("/etc/papersize" , {st_mode=S_IFREG|0644, st_size=3, ...}) = 0
open ("/etc/papersize" , O_RDONLY)     = 9
fstat (9 , {st_mode=S_IFREG|0644, st_size=3, ...}) = 0
mmap (NULL, 4096, PROT_READ|PROT_WRITE, MAP_PRIVATE|MAP_ANONYMOUS, -1, 0) = 0x7fd5c4d23000
read(9, "a4\n", 4096)               =3
close(9)                            =0
munmap(0x7fd5c4d23000, 4096)        =0
rt_sigprocmask(SIG_BLOCK, [TERM_CHLD], [ ], 8) =0
open("/var/cache/cups/job.cache.N", O_WRONLY) = -1 ENOENT (No such file or directory)
open("/var/cache/cups/job.cache.N", O_WRONLY|O_CREAT|O_EXCL, 0666) =9
fstat (9 , {st_mode=S_IFREG|0644, st_size=0, ...}) = 0
lstat ("/var/cache/cups/job.cache.N" , {st_mode=S_IFREG|0644, st_size=0, ...}) = 0
ftruncate(9, 0)                     =0
fcntl(9, f_GETFD)                   =0
```

FIG. 3

DEGRADATION PLANNING AND MITIGATION IN HYBRID CLOUD ENVIRONMENTS

BACKGROUND

Enterprises such as corporations typically utilize a cloud computing environment to manage their applications, services and data. Industry trends indicate a growing movement among the enterprises and other entities towards a multi-cloud computing environment. A multi-cloud computing environment can include one or more public clouds and one or more private clouds. This is sometimes referred to as a "hybrid cloud computing environment." These enterprises and other entities may be choosing such systems so that they can acquire additional on-demand computing, storage, and network resources, and eliminate the need to build for peak capacity within their own data centers, i.e., one or more cloud platforms can form what is known as a data center. A potential advantage of leveraging public clouds is that they may not have the same initial capital investments that may be necessary to build out an enterprise's own private data center. Another potential benefit for a public cloud is that it may better absorb an enterprise's need for elasticity by providing almost unlimited pay-as-you-grow expansion. Although hybrid cloud computing environment designs can be conceptually and financially attractive, enterprises often have little insight into which third party public cloud provider offerings may be most suitable for these enterprises' specific workloads.

SUMMARY

Embodiments described herein provide techniques for generating one or more cost aware degradation plans for hybrid cloud software.

In one illustrative embodiment, a computer program product comprises a computer readable storage medium having program instructions embodied therewith. The program instructions are executable by one or more processors to cause the one or more to construct an interaction graph based in part on a distributed application of a cloud platform comprised of a plurality of services. The program instructions are executable by one or more processors to further cause the one or more processors to extract one or more sub-graphs from the interaction graph by mining the interaction graph using one or more feasibility validation tests, to estimate a resource pressure metric for the one or more sub-graphs, wherein the resource pressure metric is at least one of a prospective resource pressure metric and a retrospective resource pressure metric, the resource pressure metric being associated with each service on one or more respective dependent services. The program instructions are executable by one or more processors to further cause the one or more processors to construct a degradation plan for a least-cost sub-graph in accordance with the estimated resource pressure metric. The program instructions are executable by one or more processors to further cause the one or more processors to apply the degradation plan to the distributed application and the cloud platform.

In one illustrative embodiment, a computer-implemented method comprises constructing an interaction graph based in part on a distributed application of a cloud platform comprised of a plurality of services. The computer-implemented method further comprises extracting one or more sub-graphs from the interaction graph by mining the interaction graph using one or more feasibility validation tests. The computer-implemented method further comprises estimating a resource pressure metric for the one or more sub-graphs, wherein the resource pressure metric is at least one of a prospective resource pressure metric and a retrospective resource pressure metric, the resource pressure metric being associated with each service on one or more respective dependent services. The computer-implemented method further comprises constructing a degradation plan for a least-cost sub-graph in accordance with the estimated resource pressure metric. The computer-implemented method further comprises applying the degradation plan to the distributed application and the cloud platform. The computer-implemented method is performed by at least one processing device comprising a processor coupled to a memory when executing program code.

In one illustrative embodiment, an apparatus comprises at least one processing device comprising a processor coupled to a memory. The at least one processing device, when executing program code, is configured to construct an interaction graph based in part on a distributed application of a cloud platform comprised of a plurality of services. The at least one processing device is further configured to extract one or more sub-graphs from the interaction graph by mining the interaction graph using one or more feasibility validation tests. The at least one processing device is further configured to estimate a resource pressure metric for the one or more sub-graphs, wherein the resource pressure metric is at least one of a prospective resource pressure metric and a retrospective resource pressure metric, the resource pressure metric being associated with each service on one or more respective dependent services. The at least one processing device is further configured to construct a degradation plan for a least-cost sub-graph in accordance with the estimated resource pressure metric. The at least one processing device is further configured to apply the degradation plan to the distributed application and the cloud platform.

These and other features and advantages of embodiments described herein will become more apparent from the accompanying drawings and the following detailed description.

BRIEF DESCRIPTION OF THE DRAWINGS

FIG. 3 depicts system call entries used in constructing the interaction graph of FIG. 2 according to an illustrative embodiment.

DETAILED DESCRIPTION

Illustrative embodiments will be described herein with reference to exemplary information processing systems and associated computers, servers, storage devices and other processing devices for generating one or more cost aware degradation plans for hybrid cloud software. It is to be appreciated, however, that embodiments are not restricted to use with the particular illustrative system and device configurations shown. Accordingly, the term "information processing system" as used herein is intended to be broadly construed, so as to encompass a wide variety of processing system, by way of example only, processing systems comprising cloud computing and storage systems as well as other types of processing systems comprising various combinations of physical and/or virtual processing resources.

Self-adaptation in software systems in response to changing context is a well-studied problem. Micro-service architecture is an enabled de-coupling of the software components so as to enable fault-tolerance and high granularity in scaling of applications. For example, some use cases include cost rationalization scenarios wherein resources need to be re-allocated to support changing product and load priorities, and cloud burst scenarios where in application transition has to be managed seamlessly across clouds during peak loads. Thus, degradation of an application in response to churns in a cluster enable the application service provider to service end-users even when the resource availability is affected. This requires micro-service application architectures to be self-adaptive. In addition, given the advent of hybrid cloud platforms, the self-adaption strategies for micro-service architectures should be well-tuned to such platforms.

Accordingly, there is a need for constructing and enacting a hybrid-cloud-construct aware application degradation plan which factors in business constraints which involve prospective and retrospective cost with respect to the degradation action such as service criticality (prospective cost), e.g., which services have a relatively higher importance to carrying out the application over other services having a relatively lower importance, and a cost of re-enablement of services when one or more resources become available (retrospective cost), e.g., a cost for upgrading a services that was deemed not critical or of relatively low importance at an earlier time. The cost aware degradation plan is self-adaptive such that it automatically adapts to external variances or changes introduced over a period of time. Thus, self-adaptive cost aware degradation plans may be viewed as a foundation for realization and implementation of autonomous computing based cost aware degradation plans.

Figure 1:
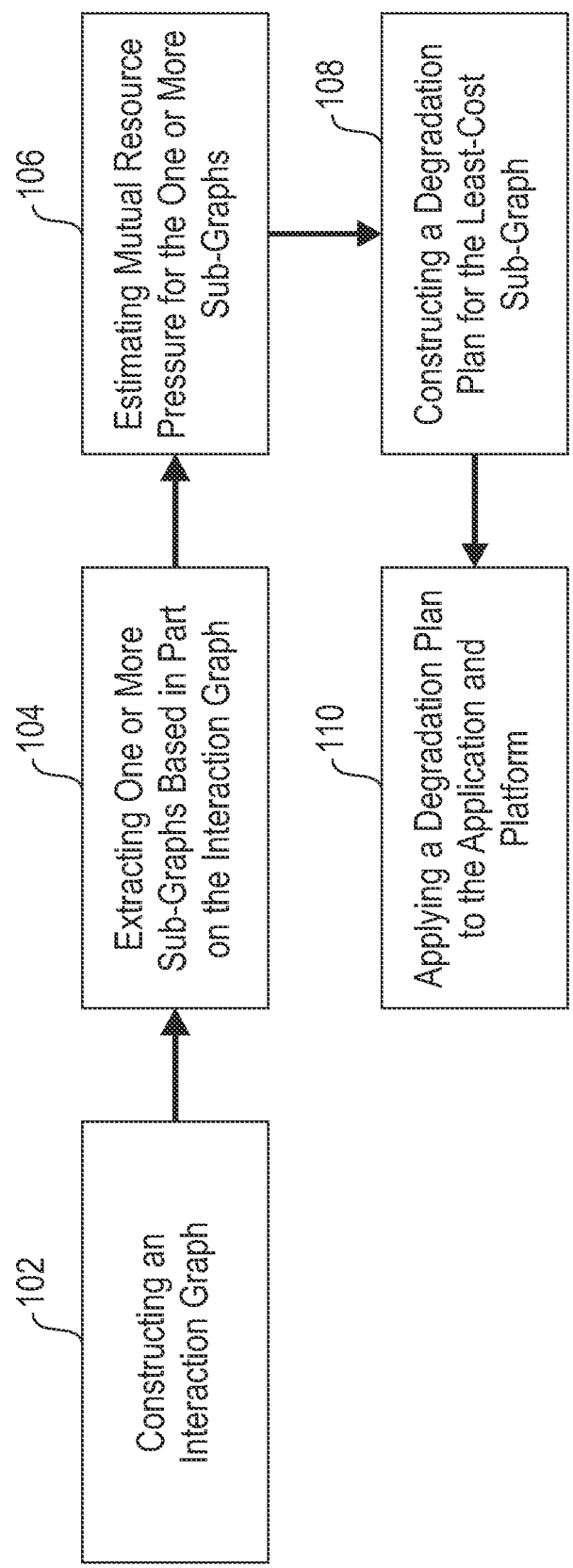
FIG. 1 illustrates a flow diagram for generating one or more cost aware degradation plans for hybrid cloud software in a computing environment according to an illustrative embodiment.
Figure 2:
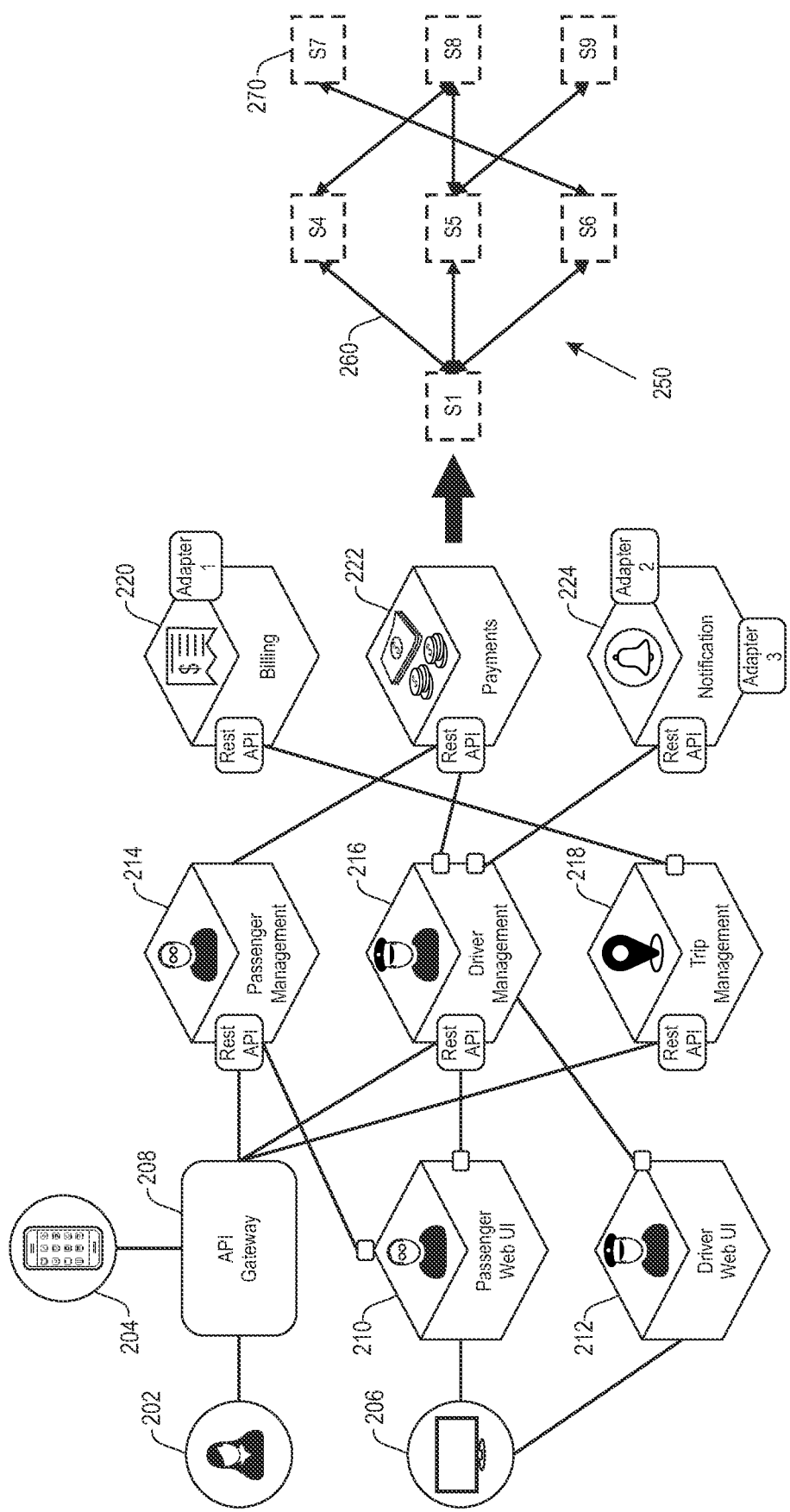
FIG. 2 illustrates constructing an interaction graph from microservices according to an illustrative embodiment.

As previously stated, the illustrated embodiments described herein provide solutions for generating prospective (e.g., service criticality) and retrospective (e.g., cost of re-enablement of services when resources become available) cost aware self-adaptive degradation plans for hybrid cloud software in a computing environment in a computing system. FIG. 1 illustrates a flow diagram for generating one or more cost aware self-adaptive degradation plans for hybrid cloud software in a computing environment according to an illustrative embodiment. As shown in FIG. 1, step 102 includes constructing an interaction graph for a given distributed application that is based at least in part on a plurality of services. To construct the graph, application end-point information (such as hostname and port) is received as input and used to identify all interacting services associated with the application. For example, as shown in FIG. 2, a microservice architecture is illustrated which includes device 204, servers 206, 210, 212 and computer system 208 for utilizing services 214 to 224.

Device 204 is an example of a device described herein for use by user 202 in accessing the microservices available in the application. The term "user" herein is intended to be broadly construed so as to encompass numerous arrangements of human, hardware, software or firmware, as well as combinations thereof. For example, user 202 can be a passenger in need of obtaining a ride and accesses a passenger management service 214 of the application to send a request to a driver for pick-up through device 204. Passenger management service 214 is operatively connected to passenger server 210. Driver receives the request through the driver management services 216 to determine if it can accept the request. Driver management services 216 is operatively connected to driver server 212. Passenger server 210 and driver server 212 are operatively connected to computer system 208 which communicate with one another over a network. The network may comprise any type of network, such as, for example, a global computer network such as the Internet, a wide area network (WAN), a local area network (LAN), a satellite network, a telephone or cable network, a cellular network, a wireless network such as a WiFi, or various portions or combinations of these and other types of networks.

Device 204, servers 206, 210, 212 and computer system 208 can be any of laptop computers, tablet computers, netbook computers, personal computers (PC), desktop computers, personal digital assistants (PDA), smart phones, wearable devices (e.g., digital eyeglasses, smart glasses, smart watches, etc.), or any programmable computer systems known in the art. In certain embodiments, device 204, servers 206, 210, 212 and computer system 508 represent computer systems utilizing clustered computers and components (e.g., database server computers, application server computers, etc.) that act as a single pool of seamless resources when accessed through the network, as is common in data centers and with cloud-computing applications. In general, device 204, servers 206, 210, 212 and computer system 208 are representative of any programmable electronic device or combination of programmable electronic devices capable of executing machine-readable program instructions and communicating with user 202 of device 204, servers 206, 210, 212 and computer system 208 via a network as discussed above. In one embodiment, computer system 208 can be an API gateway responsible for handling a microservice request from user 202 of the illustrative non-limiting services shown in FIG. 2.

In the illustrated example of FIG. 3, interaction graph 250 is generated based on, for example, application end-point information (such as hostname and port) received as input and used to identify all interacting services of the application. The example interaction graph 250 includes nodes 270 (or vertices) S1, S4, S5, S6, S7 S8 and S9 representing services, and edges 260 between the nodes to represent network paths of network communications implementing interactions between the services. For example, a first node S1 of the interaction graph 250 can represent a first service 214 in the application, and a second node S4 of the interaction graph 250 can represent a second service 224 of the application. An edge 260 between the first node S1 and the second node S4 is representative of a network path of interactions between the first and second services. In some examples, the edge can be identified with a direction of interaction to indicate the source node and the destination node. For example, the source node represents the source service that originated an interaction, and the destination node represents the destination service that receives the interaction. In the illustrated example of FIG. 2, the interaction graph 250 is a cyclic graph in that the interaction graph 250 includes backward loops between nodes.

In one illustrative embodiment, interaction graph 550 can be generated by mining interactions from, for example, system logs such as system-call logs and through active probing and passive monitoring of the application. These mined interactions are uncovered by tokenizing system call entries (e.g., see FIG. 3) and related system-call logs to extract attributes such as ports, hostname of communicating processes, message headers, file descriptors which are used to pair communicating processes and passed to the graph generation step.

As further shown in FIG. 1, step 104 includes extracting one or more sub-graphs from the interaction graph. The one or more sub-graphs are extracted from the interaction graph by mining the interaction graph using one or more feasibility validation tests. The one or more feasibility validation tests can be one or more usability tests which measure the usability of a service executing on a user's device. For example, a usability test case can be used which tracks the success/failure of an end-use functionality of a service on the distributed application for generating the feasibility sub-graphs. Each such test case can generate flow REST calls from the end-user facing user interface, to the various services being tracked. The activated services for each such flow are marked along with the edges. In addition, the particular sub-graph can be further pruned by switching off each service of the sub-graph and verifying whether the test case passed or failed. If the test case passed without the service, it is pruned along with its edges. The bare minimum sub-graph thus obtained becomes a candidate feasibility sub-graph.

Figure 4:
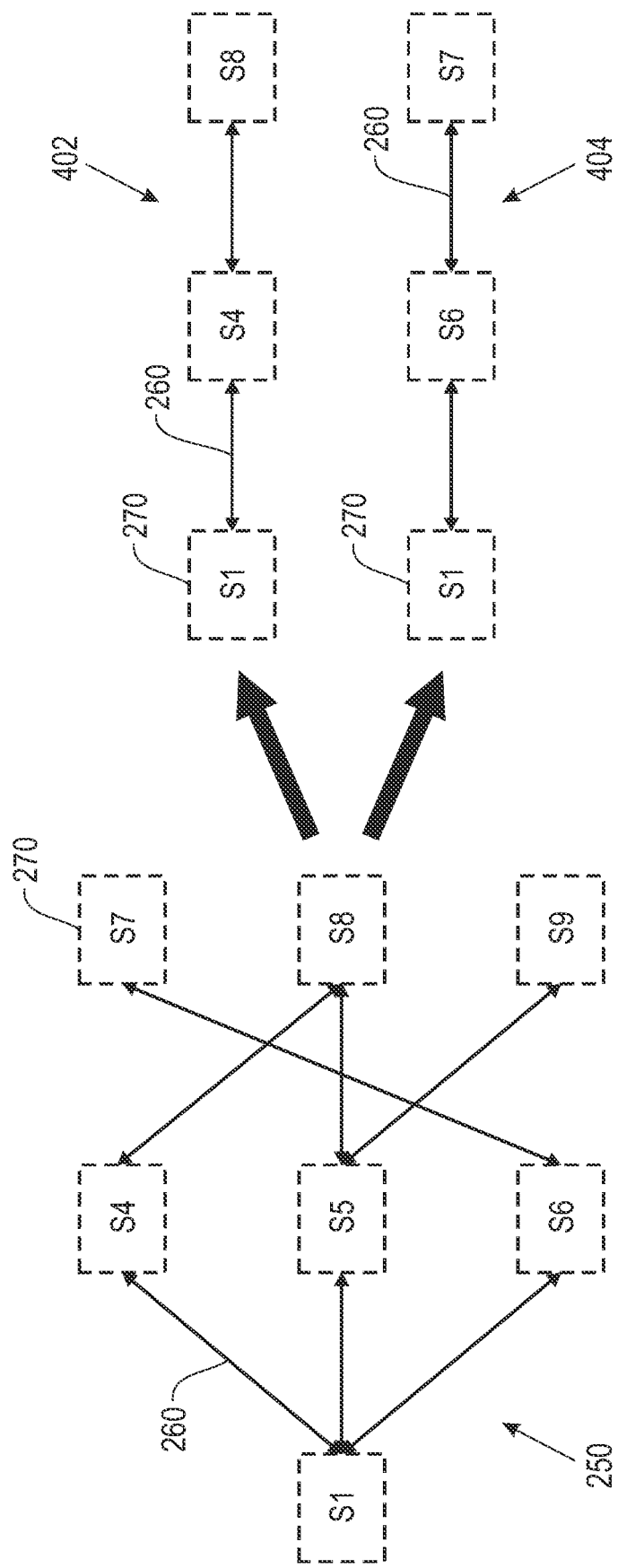
FIG. 4 illustrates extracting sub-graphs the interaction graph of FIG. 3 according to an illustrative embodiment.

In an illustrative embodiment, FIG. 4 shows sub-graphs 402 and 404 extracted from interaction graph 250. In interaction graph 250, a first target sub-graph 250 corresponding to a first target node S1 (i.e., vertice 270) is extracted. The first target sub-graph 402 includes one or more nodes 270 that can be reached through edge 260 from the first target node. For example, in sub-graph 402 node S1 is selected as the target node to analyze passenger "ride-later" bookings. The nodes that can be reached through the edges 260 from the target node S1 are then analyzed such that sub-graph 402 includes nodes S1, S4 and S8. As another example, in sub-graph 404, node S1 is selected as the target node to analyze tracking and management of existing trips. The nodes 270 that can be reached through the edges 260 from the target node S1 are then analyzed such that sub-graph 404 includes nodes S1, S6 and S7.

Figure 5:
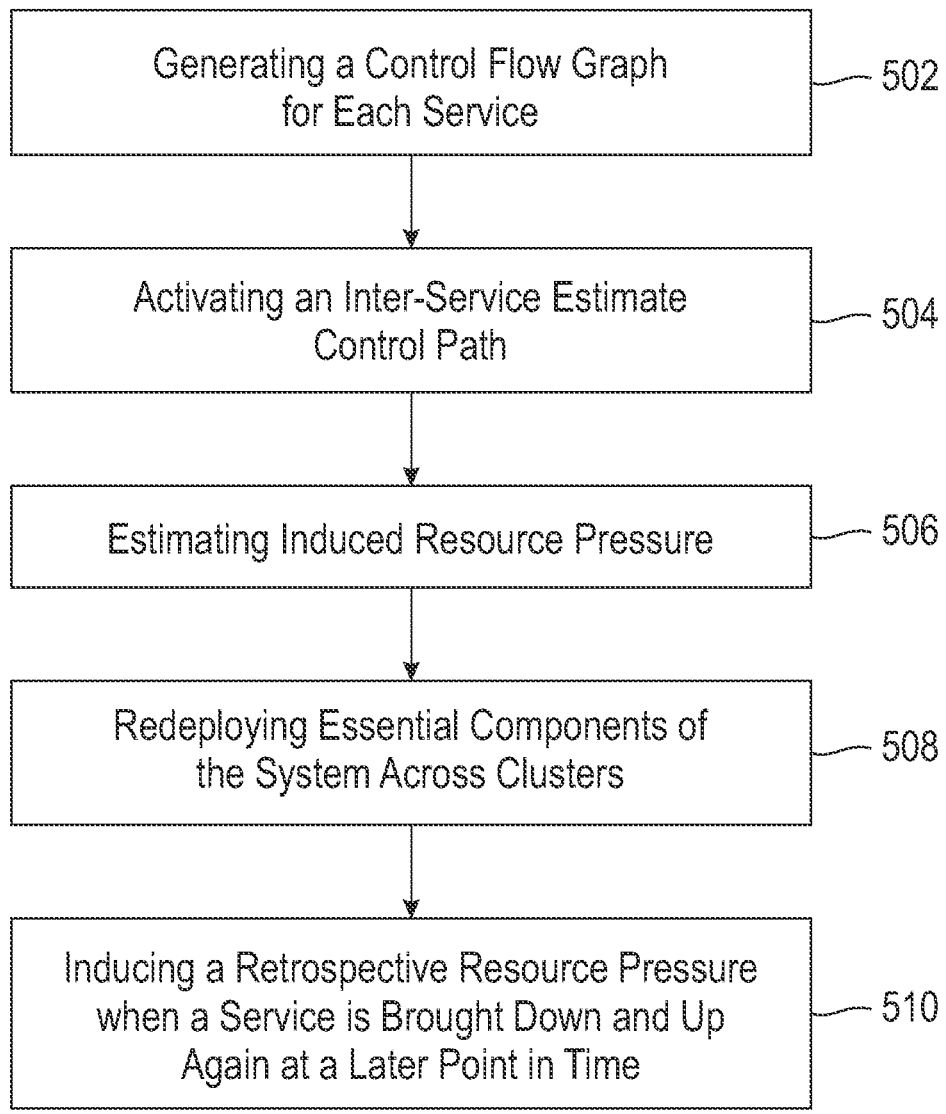
FIG. 5 illustrates a flow diagram for estimating mutual resource pressure metrics for the one or more sub-graphs according to an illustrative embodiment.

As shown in FIG. 1, step 106 includes estimating a mutual resource pressure metric for the one or more sub-graphs. In particular, this step estimates the resource pressure metric induced by each service (and its replicas) on its dependent/communicating services. As shown in FIG. 5, to derive this estimate, a first step 502 of step 106 includes generating a control flow graph for each service, where the generated control flow graph is annotated with the resource consumption metric along the nodes (basic blocks) of the graph.

A second step 504 of step 106 includes activating an inter-service estimate control path. In an illustrative embodiment, for every service pair in the sub-graph, the activation of the control flow paths occurs when one service sends a message to another service is marked. The union of all such control paths for each service pair is labeled $C_{i \to j}$, which states that service i induced the resource consumption in j through the activation of these control paths. This step is repeated for a pair of replicas of the same service when they communicate with each other.

A third step 506 of step 106 includes estimating an induced resource pressure metric. This is a step which requires the knowledge of hybrid cloud platform constructs. The induced resource pressure metric can be estimated based at least in part by intra-service resource pressure and inter-service resource pressure. In an illustrative embodiment, an intra-service resource pressure is the nature of a resource pressure metric induced by one replica of the same service on the other depending on the given hybrid-cloud construct used by the service for replication. The intra-service resource pressure is based on one or more of pressure due to lock contention and communication overhead. The pressure due to lock-contention is when multiple replicas are contending for a lock, the slow-down induced due to the lock contention add to the performance of the replicas. This may result in the replicas overusing their respective resource while waiting for the lock(s) to release. For ReplicaSets, the granularity of the lock could affect replica reads/write latency, because the same volume is mounted on all ReplicaSets. A ReplicaSet owns and manages pods and ensures that a specified number of pod "replicas" are running at any given time. The communication overhead is when replicas have their own volume (e.g., as in the case of StatefulSets) and they have to maintain the consistency by communicating the updates to peer replicas (e.g., as each replica has its own volume copy to write to), then the communication overhead of such update messages adds to the network resource consumption.

Figure 6A:
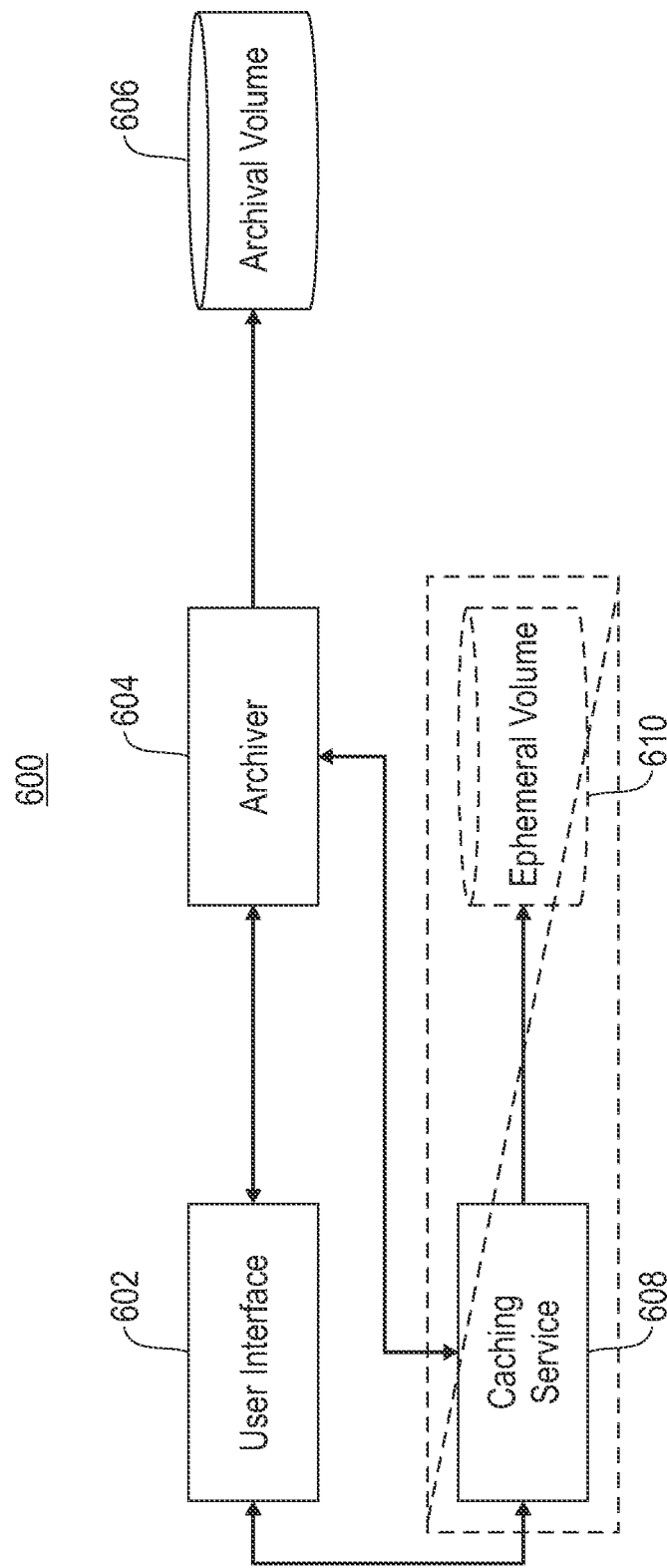
FIG. 6A illustrates a representative example of an inter-service resource pressure according to an illustrative embodiment.

In an illustrative embodiment, an inter-service resource pressure could be caused by the consumption of resources of one service induced by a request from another resource. In illustrative non-limiting embodiments, an example of an inter-service resource pressure can be seen in FIG. 6A. In this illustrative embodiment, FIG. 6A shows system 600 which includes user interface 602, archiver 604, archival volume 606, caching service 608 and ephemeral volume 610 which are operatively connected via a network as discussed above. Archival volume 606 has a relatively lower fetching capability and ephemeral volume 608 has a relatively higher fetching capability. In this illustrative non-limiting embodiment, the caching service 608 and ephemeral volume 608 are removed from operation in the system 600. The user interface 602 will still be allowed to function but with a higher latency due to direct interaction with a slow-fetching archival volume 606 used by the archiver 604. This embodiment is illustrative of the use of diverse volumes of different storage class types used in a hybrid cloud setting.

Figure 6B:
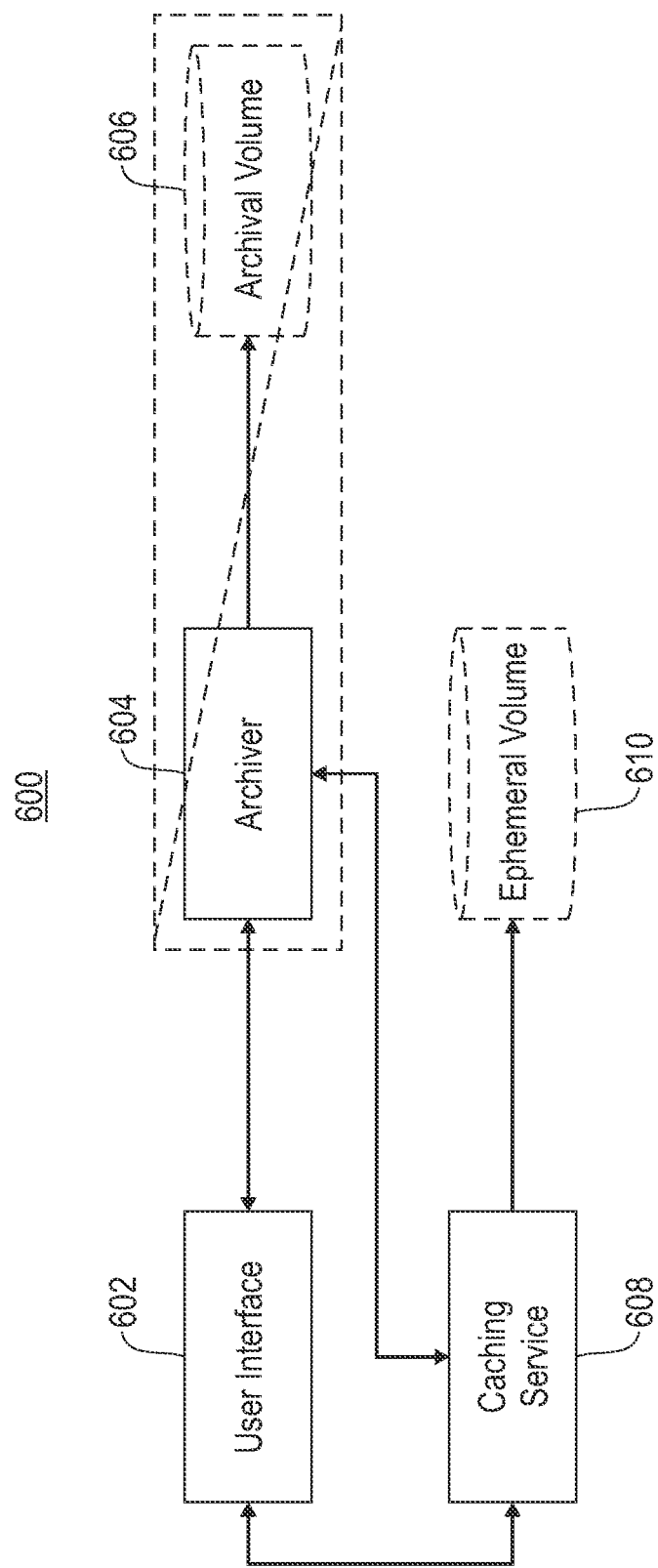
FIG. 6B illustrates another representative example of an inter-service resource pressure according to an illustrative embodiment.

Another representative example of an inter-service resource pressure can be seen in FIG. 6B. In this illustrative non-limiting embodiment, archiver 604 and archival volume 606 are removed from operation in the system 600. The user interface 602 will still be allowed to function but with a lower latency and with limited access depending on the cached content. The caching service 608 could be prompted to fill its cache or expand it temporarily so as to hold data which is frequently used.

A fourth step 508 of step 406 includes redeploying essential components of the system across clusters as a tool to alleviate resource pressure. In an illustrative embodiment, a what-if analysis is employed for moving specific essential resource components to a different cluster in the event of degrading of components with which it interacts. For example, in the previous scenario illustrated in FIGS. 6A and 6B, if the ephemeral volume of the caching service is not large enough to store enough data when the archival service is down, the ephemeral volume can be moved to a cluster which allows for more ephemeral storage space, or a cluster which allows of more pod replicas of the caching service with the original storage space. In yet another example, archival service replica pods can be removed and brought into one or more different clusters so as to alleviate the resource pressure on the network.

A fifth step 510 of step 406 includes inducing a retrospective resource pressure when a service is brought down and up again at a later point in time. This could result in triggering actions in peer services in the form of, for example, one or more of re-indexing, caching, discovery protocols being triggered, etc., which could cause resource cost to increase at a later point. This typically occurs during an upgrade following a downgrade of the system. In addition, this type of cost also needs to be factored in to the estimation of mutual resource pressure of feasibility sub-graphs.

As further shown in FIG. 4, step 408 includes constructing a degradation plan for the least-cost feasible sub-graph. In an illustrative embodiment, this step constructs a degradation plan by accounting for the resource pressure metric computed from the step 406 using hybrid cloud constructs as illustrated below. First, selective containerization or virtual-de-containerization co-location is carried out of services which communicate relatively heavily with one another. In an illustrative embodiment, a scheduling agent is configured to re-allocate computing resources from one service to another service so as to leverage resource space available in cloud hybrid environments for containerized or non-containerized workloads.

Second, co-tenancy of pre-allocated resources is carried out in which pre-allocated resources (AllocSets) for jobs/services which are within the feasibility sub-graph could be shared among the vertices of the sub-graph. For example, a wait-induced serialization can be carried out in which if one service A depends on the other service B, and the allocated resources available to A possess enough capabilities to assist with service B, then A could be executed first using its resources, and then B can be executed utilizing the same resource. In another example, a reshaping by Replica reduction can be carried out in which replicas of A could be reduced to assist to the replicas of service B in the same pre-allocated resource set. In yet another example, a pause-and-hop can be carried out in which the execution of service B could be paused and un-paused to utilize the fragmented availability of the resources in the pre-allocated set.

The above strategies are encoded into a plan which contains, for example, <SERVICE, STRATEGY, EVENTS> tuples to be enacted to enable degraded execution. The plan-feasibility sub-graph which could be enforced within the resource availability of the platform, and which results in least latency induced due to strategy enactment is selected for deployment.

As further shown in FIG. 4, step 410 includes applying a degradation plan to the application and cloud platform by monitoring the deployment and applying the strategy in response to a triggering event. In illustrative embodiments, a triggering event can be one or more of a flash-load, a steady-heavy-load, a light-load, a service failure, etc.

It is understood in advance that although this disclosure includes a detailed description on cloud computing, implementation of the teachings recited herein are not limited to a cloud computing environment. Rather, illustrative embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
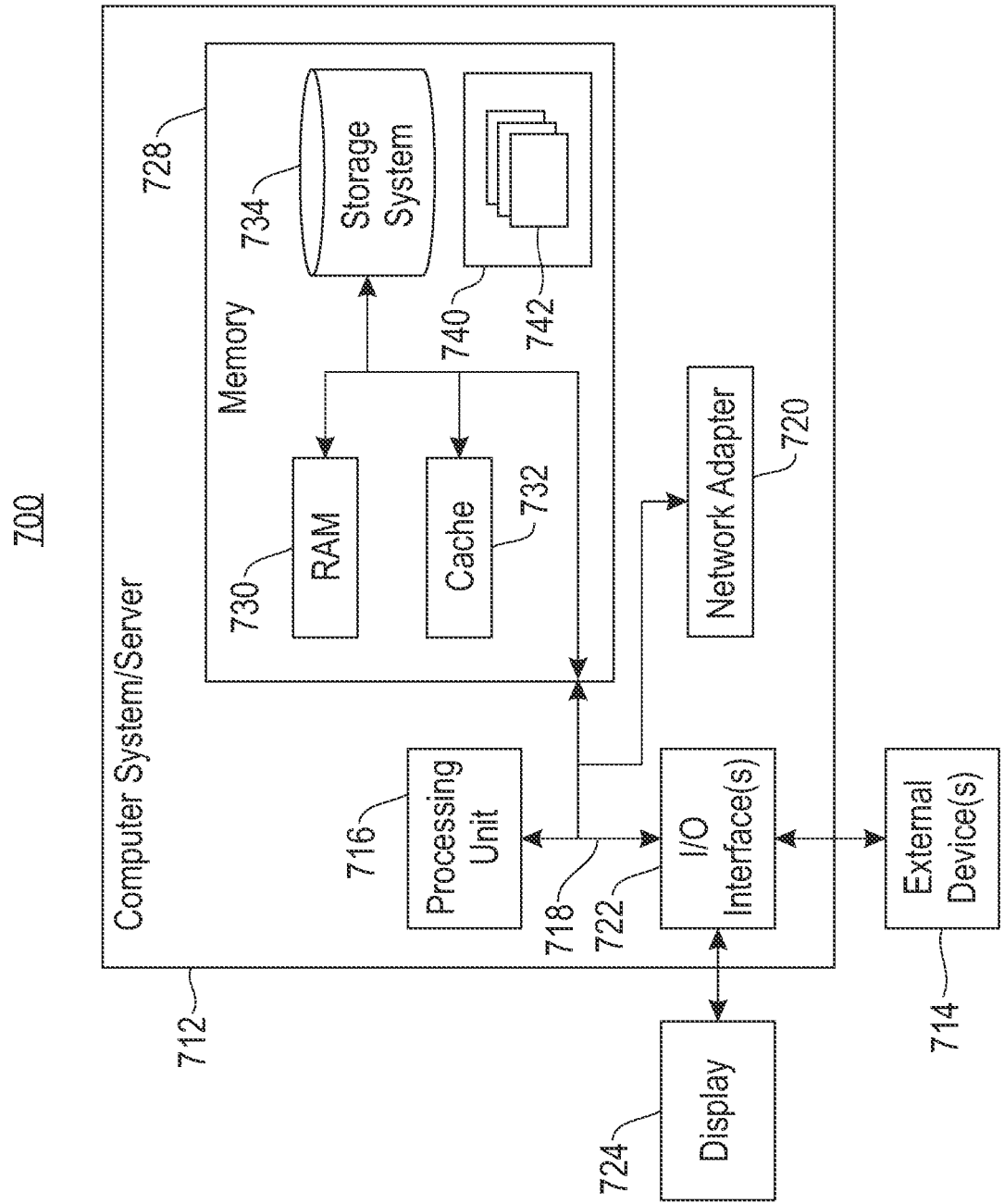
FIG. 7 is a block diagram depicting an exemplary cloud computing node according to an illustrative embodiment.

Referring now to FIG. 7, a schematic of an example of a cloud computing node is shown. Cloud computing node 700 is only one example of a suitable cloud computing node and is not intended to suggest any limitation as to the scope of use or functionality of illustrative embodiments described herein. Regardless, cloud computing node 700 is capable of being implemented and/or performing any of the functionality set forth hereinabove.

In cloud computing node 700 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 700 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random-access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of the illustrative embodiments described herein.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of the illustrative embodiments described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
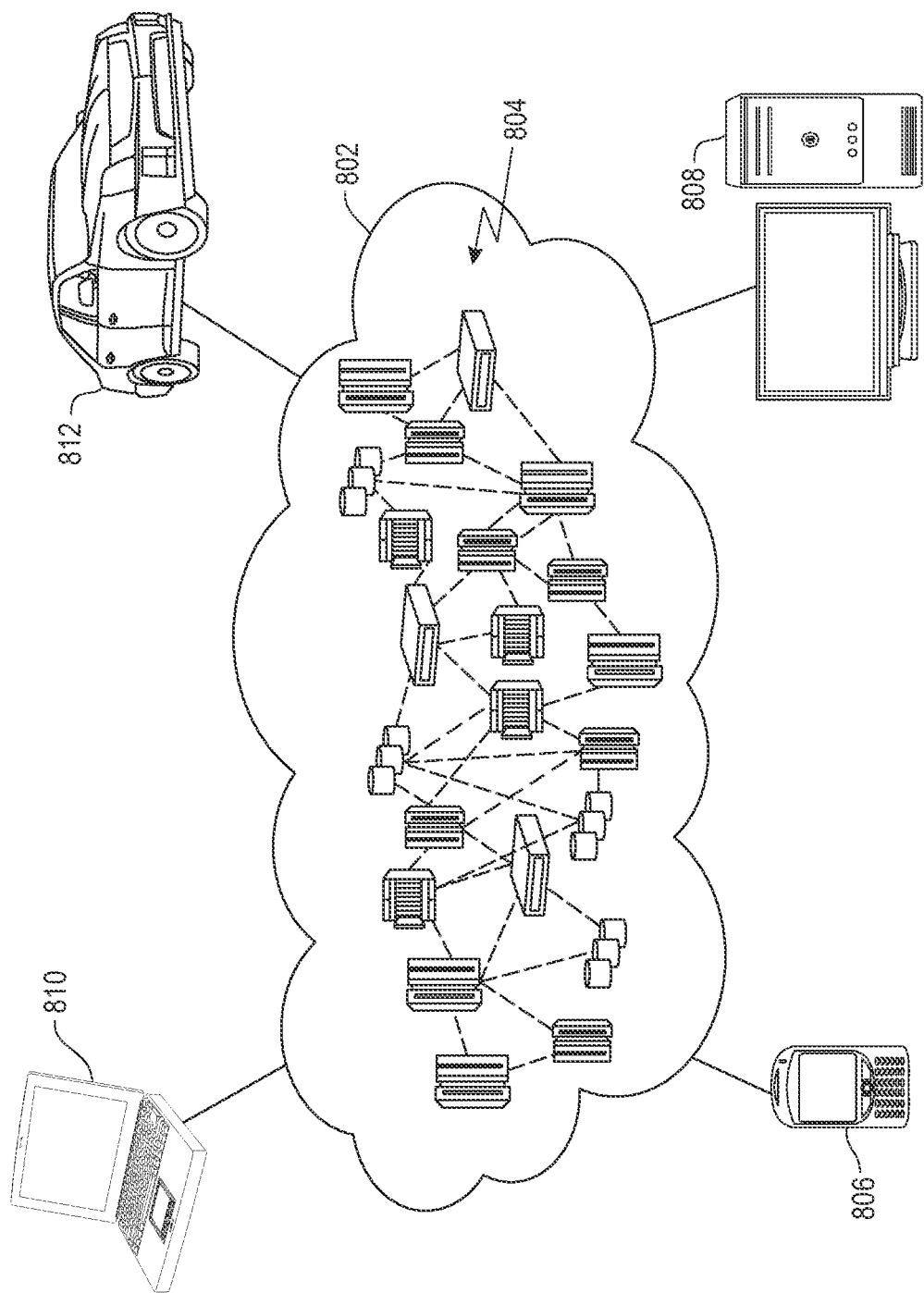
FIG. 8 is an additional block diagram depicting an exemplary cloud computing environment according to an illustrative embodiment.

Referring now to FIG. 8, illustrative cloud computing environment 802 is depicted. As shown, cloud computing environment 802 includes one or more cloud computing nodes 804 with which local computing devices used by cloud consumers, such as, for example, personal digital assistant (PDA) or cellular telephone 806, desktop computer 808, laptop computer 810, and/or automobile computer system 812 may communicate. Nodes 804 may communicate with one another. They may be grouped (not shown) physically or virtually, in one or more networks, such as Private, Community, Public, or Hybrid clouds as described hereinabove, or a combination thereof. This allows cloud computing environment 802 to offer infrastructure, platforms and/or software as services for which a cloud consumer does not need to maintain resources on a local computing device. It is understood that the types of computing devices 806-812 shown in FIG. 8 are intended to be illustrative only and that computing nodes 804 and cloud computing environment 802 can communicate with any type of computerized device over any type of network and/or network addressable connection (e.g., using a web browser).

Figure 9:
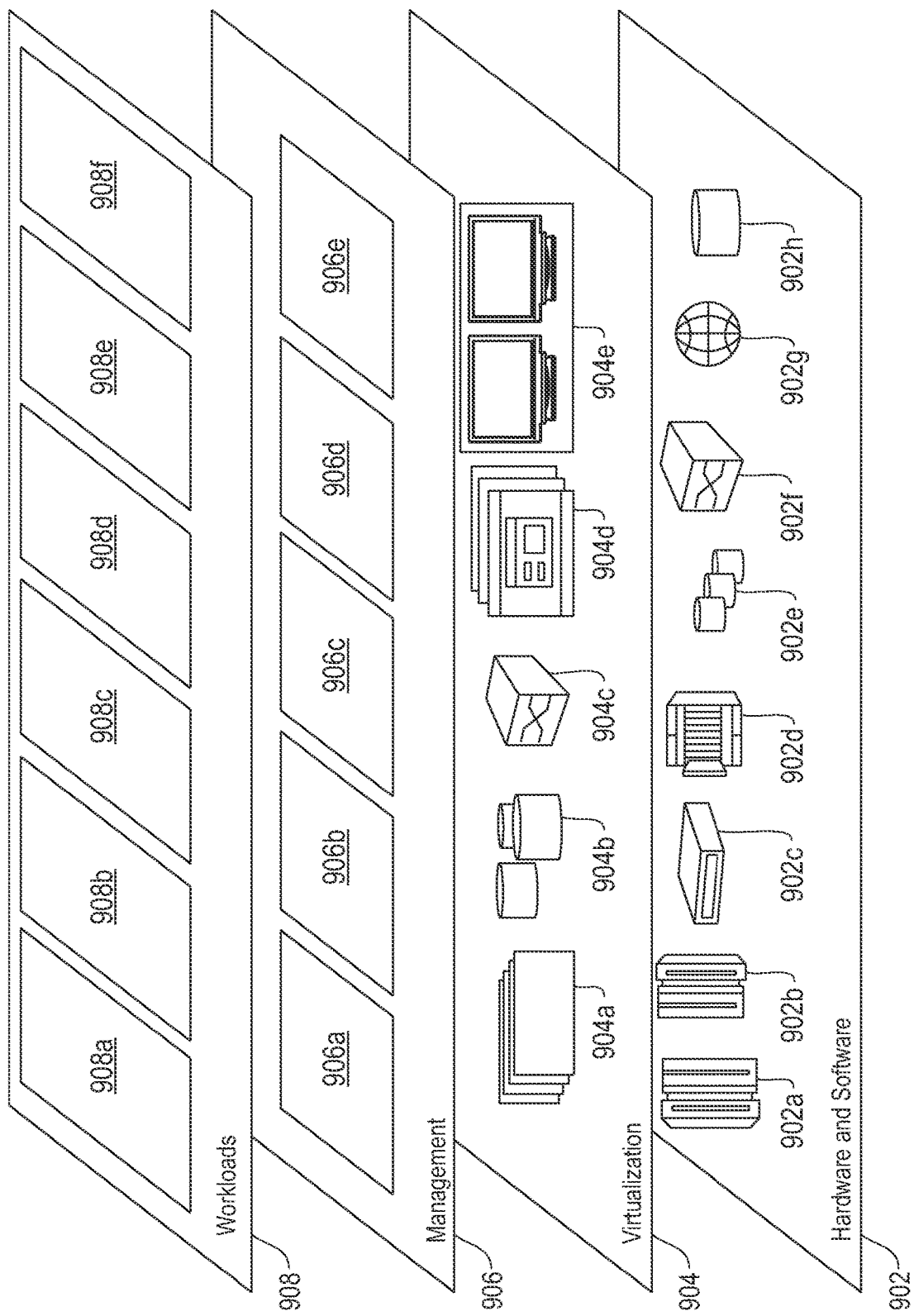
FIG. 9 is an additional block diagram depicting abstraction model layers according to an illustrative embodiment.

Referring now to FIG. 9, a set of functional abstraction layers provided by cloud computing environment 802 (FIG. 8) is shown. It should be understood in advance that the components, layers, and functions shown in FIG. 9 are intended to be illustrative only and the embodiments described herein are not limited thereto. As depicted, the following layers and corresponding functions are provided:

Hardware and software layer 902 includes hardware and software components. Examples of hardware components include: mainframes 902a; RISC (Reduced Instruction Set Computer) architecture based servers 902b; servers 902c; blade servers 902d; storage devices 902e; and networks and networking components 902f. In some embodiments, software components include network application server software 902g and database software 902h.

Virtualization layer 904 provides an abstraction layer from which the following examples of virtual entities may be provided: virtual servers 904a; virtual storage 904b; virtual networks 904c, including virtual private networks; virtual applications and operating systems 904d; and virtual clients 904e. In one example, management layer 906 may provide the functions described below. Resource provisioning 906a provides dynamic procurement of computing resources and other resources that are utilized to perform tasks within the cloud computing environment. Metering and Pricing 906b provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 906c provides access to the cloud computing environment for consumers and system administrators. Service level management 906d provides cloud computing resource allocation and management such that required service levels are met. Service Level Agreement (SLA) planning and fulfillment 906e provide pre-arrangement for, and procurement of, cloud computing resources for which a future requirement is anticipated in accordance with an SLA.

Workloads layer 908 provides examples of functionality for which the cloud computing environment may be utilized. Examples of workloads and functions which may be provided from this layer include: mapping and navigation 908a; software development and lifecycle management 908b; virtual classroom education delivery 908c; data analytics processing 908d; transaction processing 908e; and cost-aware self-adaptive degradation plans 908f, in accordance with the one or more embodiments.

The terminology used herein is for the purpose of describing particular embodiments only and is not intended to be limiting of the illustrative embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one illustrative embodiment may provide a beneficial effect such as, for example, generating prospective (e.g., service criticality) and retrospective (e.g., cost of re-enablement of services when resources become available) cost aware self-adaptive degradation plans for hybrid cloud software in a computing environment in a computing system.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable storage medium having program instructions embodied therewith, the program instructions executable by one or more processors to cause the one or more processors to:

construct an interaction graph based in part on a distributed application of a cloud platform comprised of a plurality of services by probing, monitoring and mining interactions from the distributed application;

extract one or more sub-graphs from the interaction graph by mining the interaction graph using one or more feasibility validation tests, the one or more feasibility validation tests comprising:

generating a test case for a target service of the plurality of services of the distributed application;

generating a plurality of calls corresponding to the plurality of services of the distributed application to activate the plurality of services for the test case; and removing one or more of the plurality of services from the interaction graph based on the test case passing without the one or more of the plurality of services being activated;

estimate a resource pressure metric for the one or more sub-graphs, wherein the resource pressure metric is based on a prospective resource pressure metric and a retrospective resource pressure metric, the resource pressure metric being associated with each service on one or more respective dependent services, the estimating comprising:

generating a control flow graph for each service of a given sub-graph of the one or more sub-graphs, the control flow graph comprising a resource consumption metric for the service; and activating a control path for each interacting service pair of the sub-graph, the control path comprising an interacting service pair resource consumption metric for each interacting service pair of the sub-graph;

construct a degradation plan for a least-cost sub-graph in accordance with the estimated resource pressure metric, the degradation plan comprising one or more strategies encoded in tuples to enact deployment and application of the degradation plan; and deploy and monitor the degradation plan and, wherein a triggering event occurs, apply the degradation plan to the distributed application and the cloud platform.

2. The computer program product of claim 1, wherein the interaction graph comprises one or more vertices and one or more edges, and constructing the interaction graph comprises identifying each vertice as a respective service of the plurality of services, and identifying each edge as an instance of two services interacting with each other.

3. The computer program product of claim 1, wherein extracting the one or more sub-graphs from the interaction graph by mining the interaction graph using the one or more feasibility validation tests comprises conducting one or more usability test cases to track one or more of a success and a failure of an end-use functionality of a respective service.

4. The computer program product of claim 1, wherein estimating the resource pressure metric for the one or more sub-graphs comprises estimating the resource consumption metric of one service of each interacting service pair of the one or more sub-graphs based on a request from another service of each interacting service pair of the one or more sub-graphs.

5. The computer program product of claim 1, wherein constructing the degradation plan for the least-cost sub-graph in accordance with the estimated resource pressure metric comprises performing one of containerizing or de-containerizing services to leverage resource space available in a containerized or non-containerized workload based in part on at least the estimated resource pressure metric.

6. The computer program product of claim 1, wherein constructing the degradation plan for the least-cost sub-graph in accordance with the estimated resource pressure metric comprises responsive to a first service being dependent on a second service, and allocated resources for executing the second service can also be utilized to execute the first service, executing the second service utilizing the allocated resources and thereafter executing the first service utilizing the allocated resources of the first service.

7. The computer program product of claim 1, wherein the triggering event is one or more of a flash-load, a steady-heavy-load, a light-load, and a service failure.

8. A computer-implemented method, comprising:

constructing an interaction graph based in part on a distributed application of a cloud platform comprised of a plurality of services by probing, monitoring and mining interactions from the distributed application;

extracting one or more sub-graphs from the interaction graph by mining the interaction graph using one or more feasibility validation tests, the one or more feasibility validation tests comprising:

generating a test case for a target service of the plurality of services of the distributed application;

generating a plurality of calls corresponding to the plurality of services of the distributed application to activate the plurality of services for the test case; and removing one or more of the plurality of services from the interaction graph based on the test case passing without the one or more of the plurality of services being activated;

estimating a resource pressure metric for the one or more sub-graphs, wherein the resource pressure metric is based on a prospective resource pressure metric and a retrospective resource pressure metric, the resource pressure metric being associated with each service on one or more respective dependent services, the estimating comprising:

generating a control flow graph for each service of a given sub-graph of the one or more sub-graphs, the control flow graph comprising a resource consumption metric for the service; and activating a control path for each interacting service pair of the sub-graph, the control path comprising an interacting service pair resource consumption metric for each interacting service pair of the sub-graph;

constructing a degradation plan for a least-cost sub-graph in accordance with the estimated resource pressure metric, the degradation plan comprising one or more strategies encoded in tuples to enact deployment and application of the degradation plan; and deploying and monitoring the degradation plan and, wherein a triggering event occurs, applying the degradation plan to the distributed application and the cloud platform;

wherein the computer-implemented method is performed by at least one processing device comprising a processor coupled to a memory when executing program code.

9. The computer-implemented method of claim 8, wherein the interaction graph comprises one or more vertices and one or more edges, and constructing the interaction graph comprises identifying each vertice as a respective service of the plurality of services, and identifying each edge as an instance of two services interacting with each other.

10. The computer-implemented method of claim 8, wherein extracting the one or more sub-graphs from the interaction graph by mining the interaction graph using the one or more feasibility validation tests comprises conducting one or more usability test cases to track one or more of a success and a failure of an end-use functionality of a respective service.

11. The computer-implemented method of claim 8, wherein estimating the resource pressure metric for the one or more sub-graphs comprises estimating the resource consumption metric of one service of each interacting service pair of the one or more sub-graphs based on a request from another service of each interacting service pair of the one or more sub-graphs.

12. The computer-implemented method of claim 8, wherein constructing the degradation plan for the least-cost sub-graph in accordance with the estimated resource pressure metric comprises performing one of containerizing or de-containerizing services to leverage resource space available in a containerized or non-containerized workload based in part on at least the estimated resource pressure metric.

13. The computer-implemented method of claim 8, wherein constructing the degradation plan for the least-cost sub-graph in accordance with the estimated resource pressure metric comprises responsive to a first service being dependent on a second service, and allocated resources for executing the second service can be utilized to execute the first service, executing the second service utilizing the allocated resources and thereafter executing the first service utilizing the allocated resources of the first service.

14. The computer-implemented method of claim 8, wherein the triggering event is one or more of a flash-load, a steady-heavy-load, a light-load, and a service failure.

15. An apparatus, comprising:
at least one processing device comprising a processor coupled to a memory, the at least one processing device, when executing program code, is configured to:
construct an interaction graph based in part on a distributed application of a cloud platform comprised of a plurality of services by probing, monitoring and mining interactions from the distributed application;
extract one or more sub-graphs from the interaction graph by mining the interaction graph using one or more feasibility validation tests, the one or more feasibility validation tests comprising:
generating a test case for a target service of the plurality of services of the distributed application;
generating a plurality of calls corresponding to the plurality of services of the distributed application to activate the plurality of services for the test case; and
removing one or more of the plurality of services from the interaction graph based on the test case passing without the one or more of the plurality of services being activated;
estimate a resource pressure metric for the one or more sub-graphs, wherein the resource pressure metric is based on a prospective resource pressure metric and a retrospective resource pressure metric, the resource pressure metric being associated with each service on one or more respective dependent services, the estimating comprising:
generating a control flow graph for each service of a given sub-graph of the one or more sub-graphs, the control flow graph comprising a resource consumption metric for the service; and
activating a control path for each interacting service pair of the sub-graph, the control path comprising an interacting service pair resource consumption metric for each interacting service pair of the sub-graph;

construct a degradation plan for a least-cost sub-graph in accordance with the estimated resource pressure metric, the degradation plan comprising one or more strategies encoded in tuples to enact deployment and application of the degradation plan; and
deploy and monitor the degradation plan and, wherein a triggering event occurs, apply the degradation plan to the distributed application and the cloud platform.

16. The apparatus of claim 15, wherein the interaction graph comprises one or more vertices and one or more edges, and constructing the interaction graph comprises identifying each vertex as a respective service of the plurality of services, identifying each edge as an instance of two services interacting with each other.

17. The apparatus of claim 15, wherein constructing the degradation plan for the least-cost sub-graph in accordance with the estimated resource pressure metric comprises performing one of containerizing or de-containerizing services to leverage resource space available in a containerized or non-containerized workload based in part on at least the estimated resource pressure metric.

18. The apparatus of claim 15, wherein constructing the degradation plan for the least-cost sub-graph in accordance with the estimated resource pressure metric comprises responsive to a first service being dependent on a second service, and allocated resources for executing the second service can be utilized to execute the first service, executing the second service utilizing the allocated resources and thereafter executing the first service utilizing the allocated resources of the first service.

19. The apparatus of claim 15, wherein extracting the one or more sub-graphs from the interaction graph by mining the interaction graph using the one or more feasibility validation tests comprises conducting one or more usability test cases to track one or more of a success and a failure of an end-use functionality of a respective service.

20. The apparatus of claim 15, wherein the triggering event is one or more of a flash-load, a steady-heavy-load, a light-load, and a service failure.

\* \* \* \* \*